US009606846B2

(12) United States Patent
Droshev et al.

(10) Patent No.: US 9,606,846 B2
(45) Date of Patent: *Mar. 28, 2017

(54) SYSTEM AND METHOD FOR DYNAMIC PROXY GENERATION

(75) Inventors: Mladen I. Droshev, Sofia (BG); Ivan T. Atanassov, Sofia (BG); Nikolai W. Neichev, Sofia (BG); Georgi N. Stanev, Sofia (BG)

(73) Assignee: SAP SE, Walldorf (DE)

( * ) Notice: Subject to any disclaimer, the term of this patent is extended or adjusted under 35 U.S.C. 154(b) by 941 days.

This patent is subject to a terminal disclaimer.

(21) Appl. No.: 11/193,167

(22) Filed: Jul. 29, 2005

(65) Prior Publication Data

US 2007/0027878 A1    Feb. 1, 2007

(51) Int. Cl.
*G06F 9/44*    (2006.01)
*G06F 9/54*    (2006.01)
(52) U.S. Cl.
CPC .............. *G06F 9/548* (2013.01); *G06F 9/547* (2013.01)
(58) Field of Classification Search
USPC ................................ 717/140, 151; 719/330
See application file for complete search history.

(56) References Cited

U.S. PATENT DOCUMENTS

| | | | |
|---|---|---|---|
| 5,682,534 A * | 10/1997 | Kapoor et al. | 719/328 |
| 5,684,955 A | 11/1997 | Meyer et al. | |
| 6,061,721 A | 5/2000 | Ismael et al. | |
| 6,157,960 A * | 12/2000 | Kaminsky et al. | 719/315 |
| 6,253,256 B1 | 6/2001 | Wollrath et al. | |
| 6,279,030 B1 | 8/2001 | Britton et al. | |
| 6,385,722 B1 | 5/2002 | Connelly et al. | |
| 6,408,342 B1 * | 6/2002 | Moore et al. | 719/330 |
| 6,412,010 B1 | 6/2002 | Kind | |
| 6,496,850 B1 | 12/2002 | Bowman-Amuah | |
| 6,519,594 B1 | 2/2003 | Li | |

(Continued)

FOREIGN PATENT DOCUMENTS

JP        2000250758 A        9/2000

OTHER PUBLICATIONS

Baude et al., "Interactive and Descriptor-based Deployment of Object-Oriented Grid Application", 2002, Proceedings. 11th IEEE International Symposium on High Performance Distributed Computing, 2002.*

(Continued)

*Primary Examiner* — Jue Louie
(74) *Attorney, Agent, or Firm* — Schwegman Lundberg & Woessner, P.A.

(57) ABSTRACT

A system and method are described in which skeletons and/or stubs are manipulated based on deployment information. For example, a method according to one embodiment of the invention comprises: compiling source code to generate program code executable on an application server comprised of a plurality of different virtual machines, the program code containing stubs and/or skeletons; analyzing the program code to identify stubs and/or skeletons generated for objects which are located within the same virtual machine and/or the same physical machine; removing the stubs and/or skeletons for those objects which are located in the same virtual machine and/or same physical machine to generate modified program code; and deploying the modified program code.

11 Claims, 9 Drawing Sheets

(56) References Cited

U.S. PATENT DOCUMENTS

| | | | |
|---|---|---|---|
| 6,549,955 B2* | 4/2003 | Guthrie et al. | 719/315 |
| 6,618,737 B2* | 9/2003 | Aridor et al. | 707/205 |
| 6,637,025 B1 | 10/2003 | Beadle et al. | |
| 6,718,550 B1* | 4/2004 | Lim et al. | 710/310 |
| 6,728,788 B1* | 4/2004 | Ainsworth et al. | 719/330 |
| 6,854,114 B1* | 2/2005 | Sexton et al. | 718/1 |
| 6,931,429 B2 | 8/2005 | Gouge et al. | |
| 6,973,487 B2 | 12/2005 | Kimura | |
| 7,131,110 B2* | 10/2006 | Brewin | 717/108 |
| 7,231,644 B2* | 6/2007 | Kieffer | 719/331 |
| 7,266,677 B1* | 9/2007 | Bromley et al. | 713/1 |
| 7,356,562 B2* | 4/2008 | Yoon | 709/203 |
| 7,512,953 B1* | 3/2009 | Sabev | 719/316 |
| 7,533,388 B1* | 5/2009 | Cavanaugh | 719/330 |
| 7,574,714 B2* | 8/2009 | Black et al. | 719/330 |
| 2002/0046228 A1 | 4/2002 | Scheifler et al. | |
| 2002/0129078 A1 | 9/2002 | Plaxton et al. | |
| 2002/0174169 A1* | 11/2002 | Schmid | 709/201 |
| 2002/0184226 A1 | 12/2002 | Klicnik et al. | |
| 2002/0188935 A1 | 12/2002 | Hertling et al. | |
| 2003/0084204 A1 | 5/2003 | Wollrath et al. | |
| 2003/0221023 A1 | 11/2003 | Peddada et al. | |
| 2004/0019897 A1 | 1/2004 | Taylor et al. | |
| 2004/0261069 A1 | 12/2004 | Verbeke et al. | |
| 2005/0022157 A1* | 1/2005 | Brendle et al. | 717/104 |
| 2005/0155044 A1* | 7/2005 | Broussard et al. | 719/330 |
| 2006/0143601 A1* | 6/2006 | Concha et al. | 717/170 |
| 2007/0027877 A1 | 2/2007 | Droshev et al. | |
| 2007/0027878 A1 | 2/2007 | Droshev et al. | |
| 2007/0168509 A1 | 7/2007 | Droshev et al. | |

OTHER PUBLICATIONS

Lee et al., "Deployment Time Optimization of Distributed Applications", Nov. 2005, IBM Research Report, retrieved from: http://domino.research.ibm.com/comm/research_people.nsf/pages/kangwon.pubs.html.*

Schmidt et al. "Object Interconnections Collocation Optimization for CORBA", Sep. 1999, SIGS C++ Report Magazine.*

Prem et al., "BEA WebLogic Platform 7", Aug. 2003, Sams, excerpts from Chapters 10, 12, 21, 25, and 27.*

Mountjoy et al. "WebLogic: The Definitive Guide", Feb. 2004, O'Reilly Media Inc., excerpts from Chapters 10 and 14.*

Synonyms of omit from Thesaurus.com and education.yahoo.com retrieved on Jun. 2, 2009.*

Møller, "Automatic Specialization of Client/Server Interfaces", Jul. 2000, University of Copenhagean, Department of Computer Science Thesis.*

Peter Delahunty, "Remote vs Local Call Optimization", Nov. 2000, ejb-interest@java.sun.com mail archive.*

Non-Final Office Action for U.S. Appl. No. 11/323,063, Mailed Dec. 10, 2008, 19 pages.

Non-Final Office Action for U.S. Appl. No. 11/193,070, Mailed Apr. 30, 2008, 16 pages.

Final Office Action for U.S. Appl. No. 11/193,070, Mailed Oct. 28, 2008, 18 pages.

Parker, Daryl, et al., "A P2P Approach to ClassLoading in Java", Springer-Verlag, Berlin, Germany, Jul. 14, 2004, pp. 144-149.

"U.S. Appl. No. 11/193,070, Advisory Action mailed Mar. 25, 2009", 3 pgs.

"U.S. Appl. No. 11/193,070, Examiner Interview Summary mailed Dec. 22, 2008", 2 pgs.

"U.S. Appl. No. 11/193,070, Final Office Action mailed Oct. 28, 2008", 17 pgs.

"U.S. Appl. No. 11/193,070, Non Final Office Action mailed Apr. 30, 2008", 15 pgs.

"U.S. Appl. No. 11/193,070, Non-Final Office Action mailed Jun. 8, 2009", 11 pgs.

"U.S. Appl. No. 11/193,070, Response filed Mar. 2, 2009 to Final Office Action mailed Oct. 28, 2008", 17 pgs.

"U.S. Appl. No. 11/193,070, Response filed Mar. 30, 2009 to Advisory Action mailed Mar. 25, 2009", 17 pgs.

"U.S. Appl. No. 11/193,070, Response filed Jul. 30, 2008 to Non Final Office Action mailed Apr. 30, 2008", 11 pgs.

"U.S. Appl. No. 11/193,070, Response filed Sep. 3, 2009 to Non Final Office Action mailed Jun. 8, 2009", 12 pgs.

"U.S. Appl. No. 11/323,063, Advisory Action mailed Sep. 3, 2009", 3 pgs.

"U.S. Appl. No. 11/323,063, Final Office Action mailed Jun. 22, 2009", 19 pgs.

"U.S. Appl. No. 11/323,063, Non Final Office Action mailed Dec. 10, 2008", 18 pgs.

"U.S. Appl. No. 11/323,063, Response filed Mar. 10, 2009 to Non Final Office Action mailed Dec. 10, 2008", 10 pgs.

"U.S. Appl. No. 11/323,063, Response filed Aug. 20, 2009 to Final Office Action mailed Jun. 22, 2009", 10 pgs.

"U.S. Appl. No. 11/323,063, Response filed Sep. 22, 2009 to Advisory Action mailed Sep. 3, 2009", 10 pgs.

"U.S. Appl. No. 11/193,070, Non-Final Office Action mailed Nov. 27, 2009.", 17 Pgs.

"U.S. Appl. No. 11/193,070, Response filed Feb. 24, 2010 to Non Final Office Action mailed Nov. 27, 2009", 14 pgs.

"U.S. Appl. No. 11/323,063 Final Office Action mailed Dec. 9, 2009", 11 pgs.

Delahunty, P., et al., "Remote vs Local Call Optimization", ejb-interest@java.sun.commail_archive., (Nov. 2000)

"U.S. Appl. No. 11/323,063 Final Office Action mailed Jun. 11, 2010", 12 pgs.

"U.S. Appl. No. 11/193,070, Final Office Action mailed May 26, 2010", 22.

Zdun, et al., "Remoting Patterns", *Tutorial, Jax 2004*, (May 2004), 157 pages.

"U.S. Appl. No. 11/193,070, Examiner Interview Summary mailed Feb. 25, 2010", 4 pgs.

"U.S. Appl. No. 11/193,070, Examiner Interview Summary mailed Aug. 5 ,2010", 3 pgs.

"U.S. Appl. No. 11/193,070, Response filed Aug. 17, 2010 to Final Office Action mailed May 26, 2010", 16 pgs.

"U.S. Appl. No. 11/323,063, Examiner Interview Summary mailed Sep. 25, 2009", 2 pgs.

"U.S. Appl. No. 11/193,070, Non Final Office Action mailed Feb. 20, 2013", 16 pgs.

Ryan, et al., "Application Adaptation Through Transparent and Portable Object Mobility in Java", CoopIS/DOA/ODBASE 2004, LNCS 3291., (2004), 1262-1284.

\* cited by examiner

SYSTEM AND METHOD FOR DYNAMIC PROXY GENERATION

BACKGROUND

Field of the Invention

This invention relates generally to the field of data processing systems. More particularly, the invention relates to a system and method for improving the efficiency of remote method invocations ("RMI") within a multi-tiered enterprise network and for generating and configuring dynamic proxies.

Description of the Related Art

Multi-Tier Enterprise Computing Systems

Java 2 Enterprise Edition ("J2EE") is a specification for building and deploying distributed enterprise applications. Unlike traditional client-server systems, J2EE is based on a multi-tiered architecture in which server side program code is divided into several layers including a "presentation" layer and a "business logic" layer.

FIG. 1a illustrates an exemplary J2EE application server 100 in which the presentation layer is implemented as a Web container 111 and the business layer is implemented as an Enterprise Java Bean ("EJB") container 101. Containers are runtime environments which provide standard common services 119, 109 to runtime components. For example, the Java Naming and Directory Interface ("JNDI") is a service that provides application components with methods for performing standard naming and directory services. Containers also provide unified access to enterprise information systems 117 such as relational databases through the Java Database Connectivity ("JDBC") service, and legacy computer systems through the J2EE Connector Architecture ("JCA") service. In addition, containers provide a declarative mechanism for configuring application components at deployment time through the use of deployment descriptors (described in greater detail below).

As illustrated in FIG. 1a, each layer of the J2EE architecture includes multiple containers. The Web container 111, for example, is itself comprised of a servlet container 115 for processing servlets and a Java Server Pages ("JSP") container 116 for processing Java server pages. The EJB container 101 includes three different containers for supporting three different types of enterprise Java beans: a session bean container 105 for session beans, an entity bean container 106 for entity beans, and a message driven bean container 107 for message driven beans. A more detailed description of J2EE containers and J2EE services can be found in RAGAE GHALY AND KRISHNA KOTHAPALLI, SAMS TEACH YOURSELF EJB IN 21 DAYS (2003) (see, e.g., pages 353-376).

Session beans are objects which represent the high level workflow and business rules implemented by the application server 100. For example, in a customer relationship management ("CRM") system, session beans define the business operations to be performed on the underlying customer data (e.g., calculate average customer invoice dollars, plot the number of customers over a given timeframe, . . . etc). Session beans typically execute a single task for a single client during a "session." Two versions of session beans exist: "stateless" session beans and "stateful" session beans. As its name suggests, a stateless session bean interacts with a client without storing the current state of its interaction with the client. By contrast, a stateful session bean stores its state across multiple client interactions.

Entity beans are persistent objects which represent data (e.g., customers, products, orders, . . . etc) stored within a relational database. Typically, each entity bean is mapped to a table in the relational database and each "instance" of the entity bean is typically mapped to a row in the table (referred to generally as an "object-relational mapping"). Two different types of persistence may be defined for entity beans: "bean-managed persistence" and "container-managed persistence." With bean-managed persistence, the entity bean designer must provide the code to access the underlying database (e.g., SQL Java and/or JDBC commands). By contrast, with container-managed persistence, the EJB container 101 manages the underlying calls to the database.

Each enterprise Java bean ("EJB") consists of "remote home" and/or "local home" interfaces and "remote component" and/or "local component" interfaces, and one class, the "bean" class. The home interfaces list the methods available for creating, removing and finding EJBs within the EJB container. The home object is the implementation of the home interface and is generated by the EJB container at deploy time. The home object is used by clients to identify particular components and establish a connection to the components' interfaces. The component interfaces provides the underlying business methods offered by the EJB.

Remote clients access session beans and entity beans through the beans' remote interfaces, using a technique known as remote method invocation ("RMI"). Specifically, RMI allows Java objects such as EJBs to invoke methods of the remote interfaces on remote objects. Objects are considered "remote" if they are located within a different Java virtual machine ("JVM") than the invoking object. The JVM may be located on a different physical machine or on the same machine as the JVM of the invoking object.

FIG. 1b illustrates an exemplary architecture in which a local object 150 on a virtual machine 155 invokes a remote method of a remote object 151 on a different virtual machine 156. Rather than communicating directly, the local object 150 and the remote object 151 communicate through "stubs" 160 and "skeletons" 161 to execute the remote methods. The stub 160 for a remote object 151 provides a local representation of the remote object 151. The stub 160 implements the same set of remote interfaces that the remote object implements.

When a stub's method is invoked, it initiates a connection with the skeleton 161 on the remote virtual machine 156 and transmits the parameters of the method to the skeleton 161. The skeleton 161 forwards the method call to the actual remote object 151, receives the response, and forwards it back to the stub 160. The stub 160 then returns the results to the local object 150.

A "tie" for a remote object is a server-side entity which is similar to a skeleton, but which communicates with the calling object using the Internet Inter-orb protocol ("IIOP"). Another well known transport protocol used to establish communication between stubs and skeletons is the P4 protocol developed by SAP AG. As used throughout the remainder of this document, the term "skeleton" is meant to include ties and any other objects which perform the same underlying functions as skeletons.

A "deployment descriptor" is an XML file (named "ejb-jar.xml") that describes how a component is deployed within the J2EE application server 100 (e.g., security, authorization, naming, mapping of EJB's to database objects, etc). Because the deployment descriptor information is declarative, it may be changed without modifying the underlying application source code. At the time of deployment, the J2EE server 100 reads the deployment descriptor and acts on the application and/or component accordingly.

SUMMARY

A system and method are described in which skeletons and/or stubs are manipulated based on deployment information. For example, a method according to one embodiment of the invention comprises: compiling source code to generate program code executable on an application server comprised of a plurality of different virtual machines, the program code containing stubs and/or skeletons; analyzing the program code to identify stubs and/or skeletons generated for objects which are located within the same virtual machine and/or the same physical machine; removing the stubs and/or skeletons for those objects which are located in the same virtual machine and/or same physical machine to generate modified program code; and deploying the modified program code.

BRIEF DESCRIPTION OF THE DRAWINGS

A better understanding of the present invention can be obtained from the following detailed description in conjunction with the following drawings, in which.

DETAILED DESCRIPTION OF PREFERRED EMBODIMENTS

Described below is a system and method for improving the efficiency of remote method invocations ("RMI") within a multi-tiered enterprise network. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

One embodiment of the invention analyzes the relationship between local objects and remote objects to determine whether the stub of the local object can be bound directly to the remote object. For example, if the local object and remote object are located within the same Java virtual machine or the same physical machine, the skeleton may be removed and the stub may directly call methods from the remote object.

An Exemplary Cluster Architecture

Figure 2:
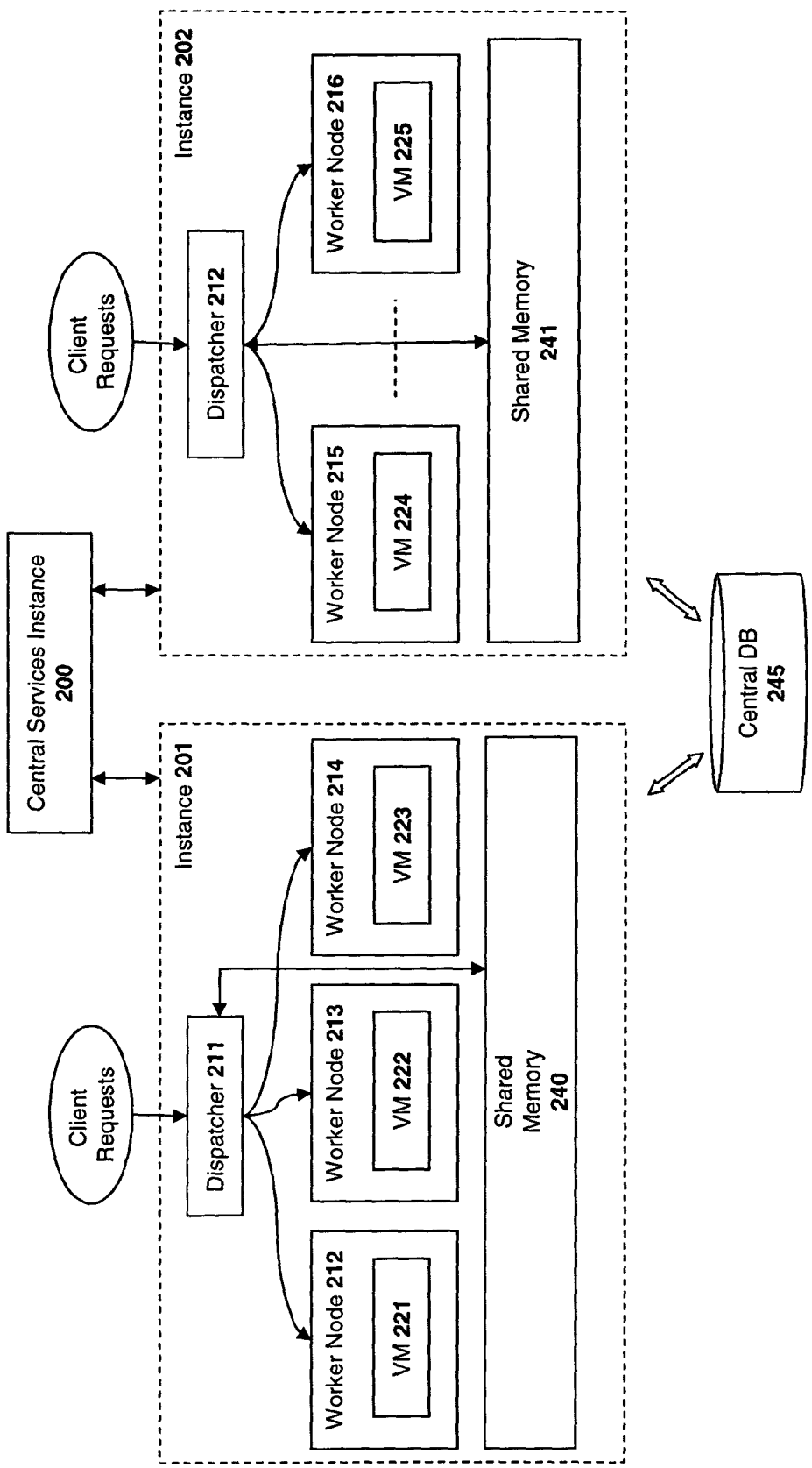
FIG. 2 illustrates an application server architecture on which embodiments of the invention may be implemented.

A system architecture on which embodiments of the invention may be implemented is illustrated in FIG. 2. The architecture includes a plurality of application server "instances" 201 and 202. The application server instances 201 and 202 each include a group of worker nodes 212-214 and 215-216 (also sometimes referred to herein as "server nodes"), respectively, and a dispatcher 211 and 212, respectively. The application server instances 201, 202 communicate through a central services instance 200 using message passing techniques. In one embodiment, the central services instance 200 includes a locking service and a messaging service (described below). The combination of all of the application server instances 201 and 202 and the central services instance 200 is referred to herein as a "cluster." Although the following description will focus solely on instance 201 for the purpose of explanation, the same principles apply to other instances within the cluster.

The worker/server nodes 212-214 within instance 201 provide the business and/or presentation logic for the network applications supported by the system. Each of the worker nodes 212-214 within a particular instance may be configured with a redundant set of programming logic and associated data, represented as virtual machines 221-223 in FIG. 2. In one embodiment, the dispatcher 211 distributes service requests from clients to one or more of the worker nodes 212-214 based on the load on each of the servers. For example, in one embodiment, the dispatcher maintains separate queues for each of the 212-214 in a shared memory 240. The dispatcher 211 fills the queues with client requests and the worker nodes 212-214 consume the requests from each of their respective queues. The client requests may be from external clients (e.g., browser requests) or from other components/objects within the instance 201 or cluster.

In one embodiment, the worker nodes 212-214 may be Java 2 Enterprise Edition ("J2EE") worker nodes which support Enterprise Java Bean ("EJB") components and EJB containers (at the business layer) and Servlets and Java Server Pages ("JSP") (at the presentation layer). In this embodiment, the virtual machines 221-225 implement the J2EE standard (as well as the additional non-standard features described herein). It should be noted, however, that certain high-level features described herein may be implemented in the context of different software platforms including, by way of example, Microsoft .NET platforms and/or the Advanced Business Application Programming ("ABAP") platforms developed by SAP AG, the assignee of the present application.

In one embodiment, communication and synchronization between each of the instances 201, 202 is enabled via the central services instance 200. As mentioned above, the central services instance 200 includes a messaging service and a locking service. The message service allows each of the servers within each of the instances to communicate with one another via a message passing protocol. For example, messages from one server may be broadcast to all other servers within the cluster via the messaging service (e.g., such as the cache configuration messages described below). Alternatively, messages may be addressed directly to specific servers within the cluster (i.e., rather than being broadcast to all servers). In one embodiment, the locking service disables access to (i.e., locks) certain specified portions of configuration data and/or program code stored within a central database 245. The locking service locks data on behalf of various system components which need to synchronize access to specific types of data and program code. In one embodiment, the central services instance 200 is the same central services instance as implemented within the Web Application Server version 6.3 and/or 6.4 developed by SAP AG. However, the underlying principles of the invention are not limited to any particular type of central services instance.

In addition, unlike prior systems, one embodiment of the invention shares objects across virtual machines 221-225. Specifically, in one embodiment, objects such as session objects which are identified as "shareable" are stored within a shared memory region 240, 241 and are made accessible to multiple virtual machines 221-225. Creating new object instances from scratch in response to client requests can be a costly process, consuming processing power and network bandwidth. As such, sharing objects between virtual machines as described herein improves the overall response time of the system and reduces server load.

In a shared memory implementation, a shared memory area 240, 241 or "heap" is used to store data objects that can be accessed by multiple virtual machines 221-225. The data objects in a shared memory heap should generally not have any pointers or references into any private heap (e.g., the private memory regions/heaps of the individual virtual machines). This is because if an object in the shared memory heap had a member variable with a reference to a private object in one particular virtual machine, that reference would be invalid for all the other virtual machines that use that shared object.

More formally, this restriction can be thought of as follows: For every shared object, the transitive closure of the objects referenced by the initial object should only contain shared objects at all times. Accordingly, in one implementation of the invention, objects are not put into the shared memory heap by themselves—rather, objects (such as the session objects described herein) are put into the shared memory heap in groups known as "shared closures." A shared closure is an initial object plus the transitive closure of all the objects referenced by the initial object.

System and Method for Improving the Efficiency of Remote Method Invocations

Figure 1A:
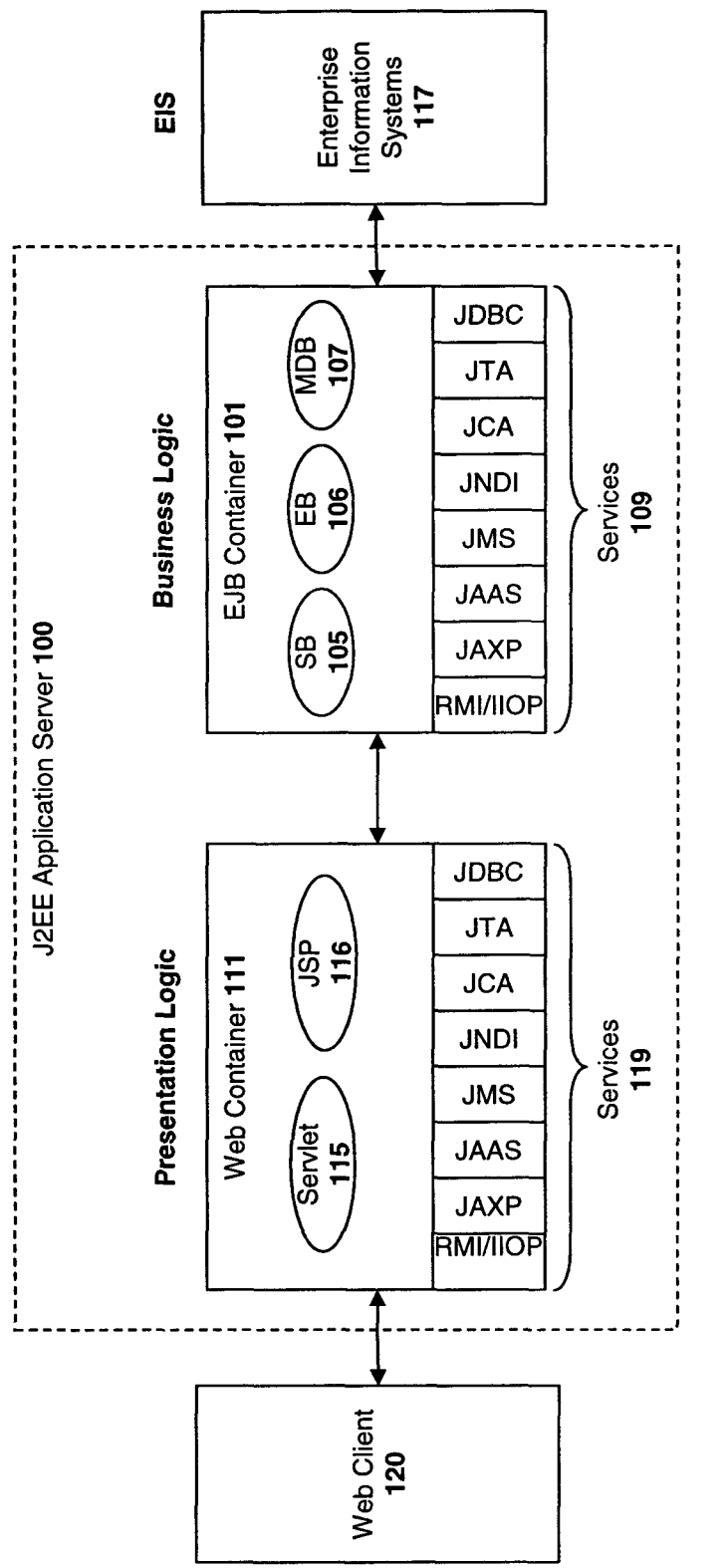
FIG. 1*a* illustrates an exemplary Java 2 Enterprise Edition architecture.
Figure 1B:
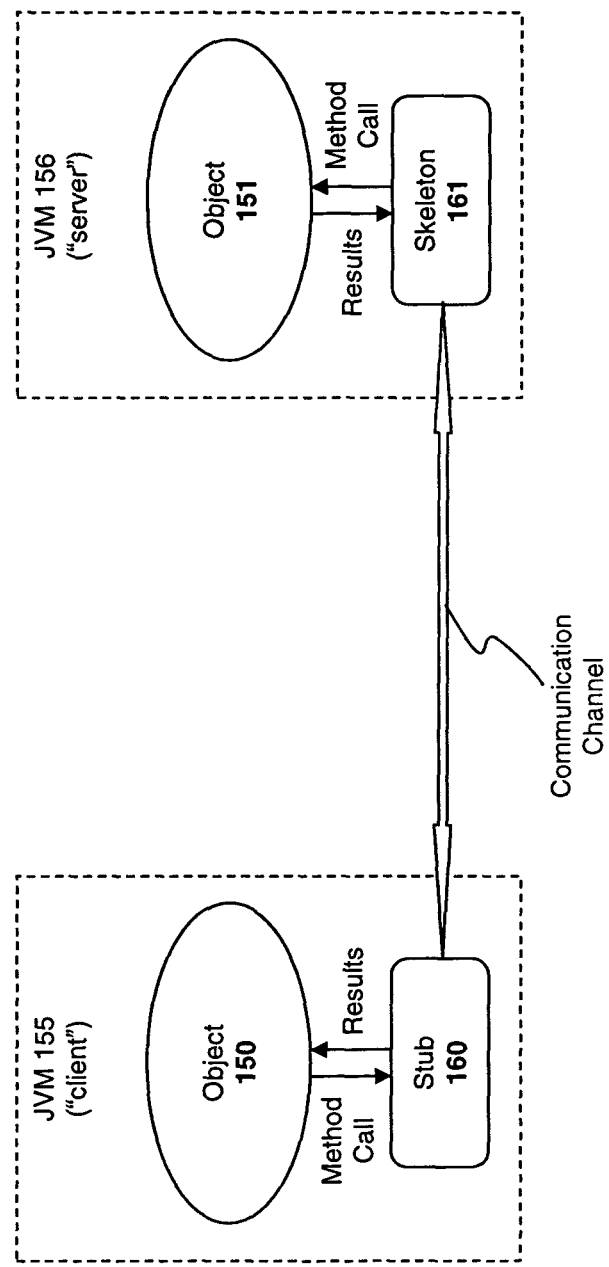
FIG. 1*b* illustrates the use of stubs and skeletons to enable communication between remote objects.

As described above with respect to FIG. 1*b*, stubs and skeletons are typically generated prior to deployment to enable communication between local and remote objects. However, when program code is developed it may not always be clear how related software components will be deployed. As a result, stubs and skeletons may be generated for objects even though those objects are eventually deployed on the same virtual machine and/or on the same physical machine. It would be more efficient under these conditions to remove the stubs and/or skeletons and to allow the local object, or the stub of the local object, to directly invoke methods from the "remote" object (which, of course, is not truly "remote" if it is located within the same virtual machine as the local object).

Figure 3:
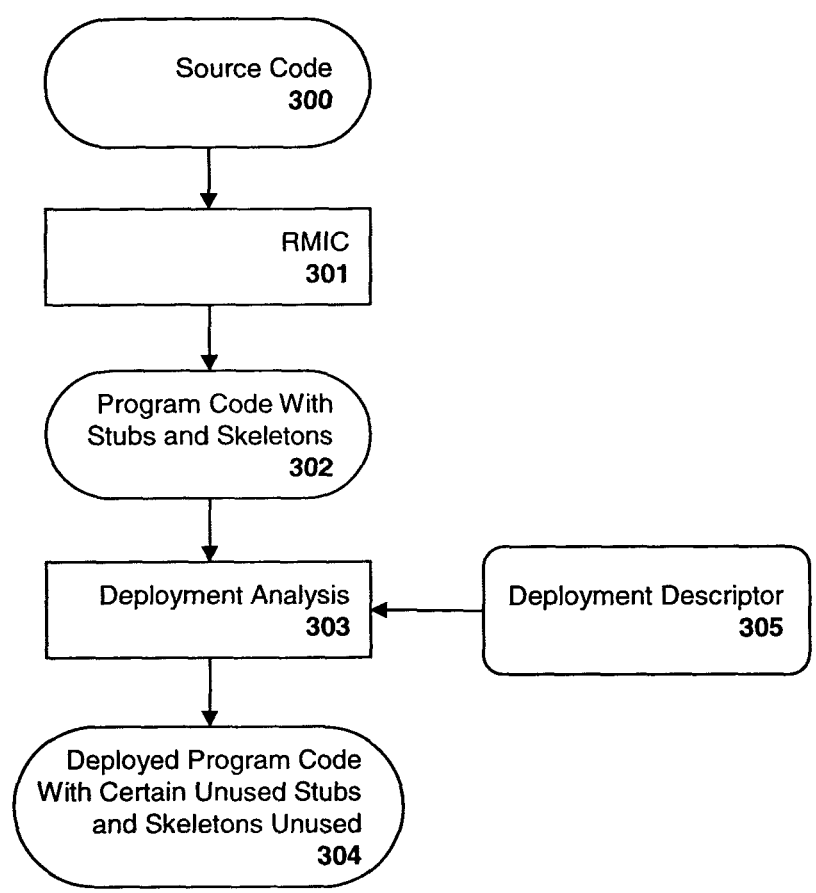
FIG. 3 illustrates a system architecture for implementing the embodiments of the invention described herein.

One embodiment of a system for addressing the foregoing issues is illustrated in FIG. 3. In this embodiment, a remote method invocation compiler ("RMIC") is used to compile source code 300 to generate executable program code (e.g., classfiles) which contain stubs and skeletons. As described above, the RMIC compiler generates stubs and skeletons for objects which may be located on different virtual machines in the final deployment. For example, if a first object within a first application/component makes a method call to a second object within a different application/component, then a stub and skeleton may be generated by the RMIC compiler to enable communication between the two objects in the event that they are deployed within different virtual machines.

Unlike prior systems, however, the system shown in FIG. 3 includes a deployment analysis module 303 to block certain stubs and/or skeletons from being used, e.g., stubs/skeletons which are unnecessary because of the deployed location of the various application components. Returning to the previous example, if the deployment analysis module 303 detects that the first application/component and the second application/component are on the same virtual machine and/or physical machine, then it may block the skeleton and/or stub from being used and directly bind the first object (i.e., the invoking object) or the stub of the first object directly to the second object (i.e., the object on which a method is invoked).

In one embodiment, the deployment analysis module 303 will determine the deployed relationship between the two applications/components by parsing the deployment descriptor 305 for the applications/components. As mentioned above, the deployment descriptor 305 is an XML file which describes how code will actually be deployed within the application server. The end result is deployed code with certain stubs and/or skeletons removed 304.

Figure 4:
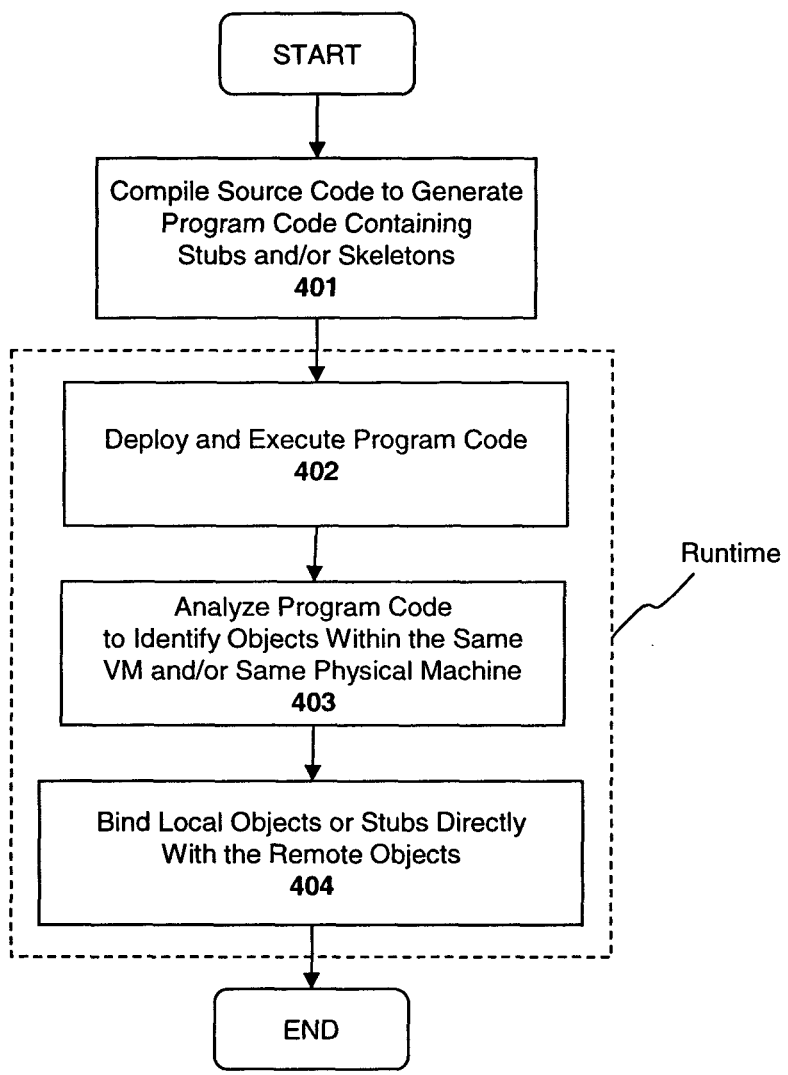
FIG. 4 illustrates a method according to one embodiment of the invention.

A method according to one embodiment of the invention is set forth in FIG. 4. At 401, source code is compiled, thereby generating program code containing stubs and skeletons. At 402, the modified program code is deployed and executed. At 403, the program code is analyzed in conjunction with the deployment descriptor to identify objects within the same virtual machine and/or physical machine. Finally, at 404, for any object which invokes a method of any other object within the same virtual machine or physical machine, the skeletons and/or stubs are blocked from being used by the system.

Figure 5:
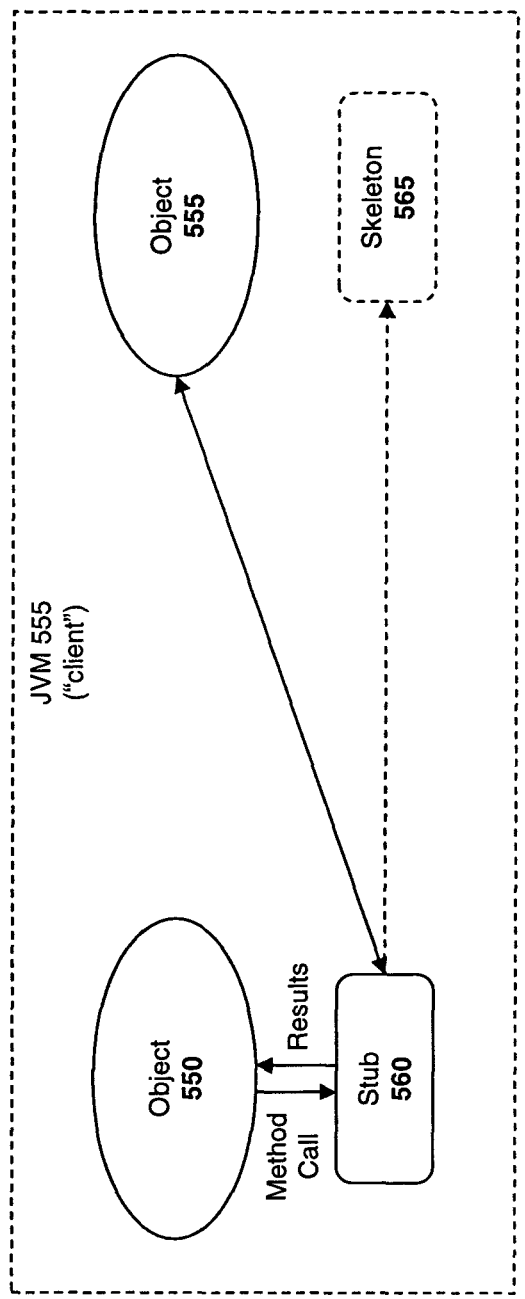
FIG. 5 illustrates a stub bound directly to a remote object as a consequence of implementing one embodiment of the invention.

FIG. 5 illustrates the end result of one embodiment in which a skeleton 565 is left unused after it has been determined that the first object 550 and the second object 555 are located in the same virtual machine and/or the same physical machine. As a result, the method call directed through the stub 560 is invoked directly on the second object 555.

System and Method for Dynamic Proxy Generation

Figure 6:
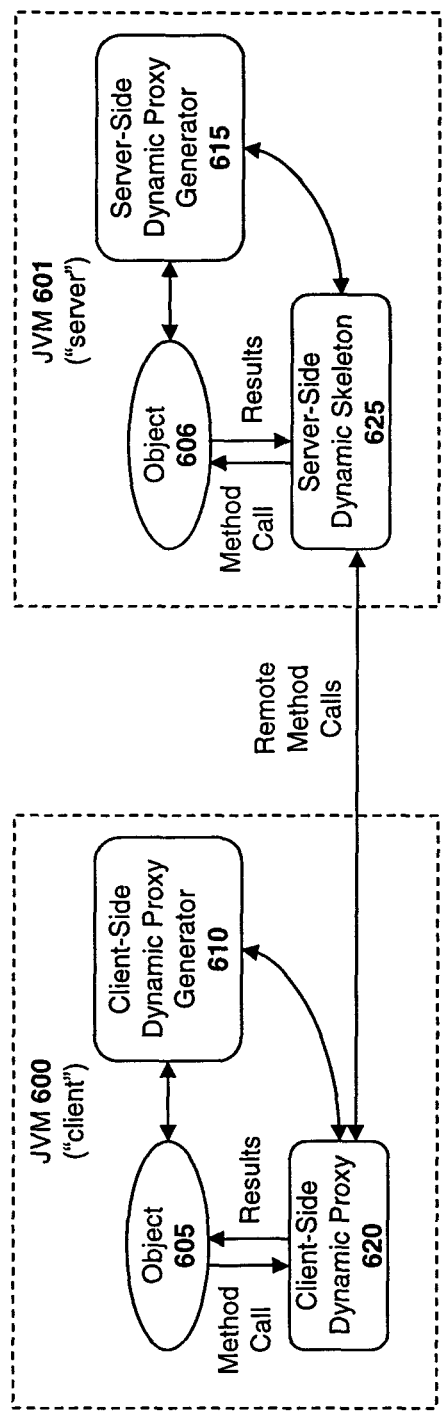
FIG. 6 illustrates one embodiment of the invention for generating dynamic proxies and/or skeletons.

In addition to deleting unnecessary stubs and skeletons as described above, one embodiment of the invention analyzes method calls during runtime and dynamically generates client-side and/or server-side proxies to manage the method calls (i.e., in situations where no static stub and/or skeleton was generated prior to runtime). Specifically, referring to FIG. 6, in one embodiment, a client-side dynamic proxy generator 610 generates a client-side dynamic proxy 620 to handle remote method invocations upon detecting that no stub exists to handle the method invocations. In the illustrated example, a remote method invocation made by object 605 on virtual machine 600 is directed to a remote object 606 on another virtual machine 601. In addition, in one embodiment, a server-side dynamic skeleton generator 615 generates a server-side dynamic skeleton 625 to handle the remote method invocation upon detecting that no static skeleton exists.

Figure 7:
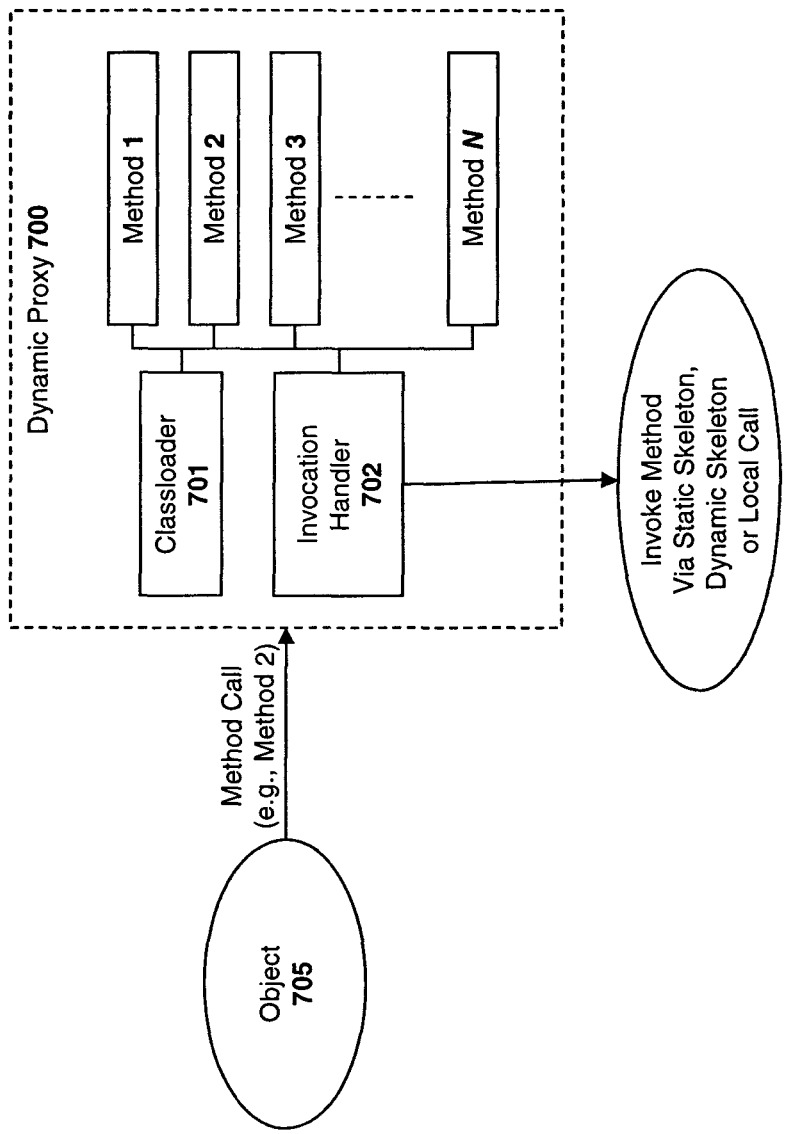
FIG. 7 illustrates a dynamic proxy generated in accordance with one embodiment of the invention.

FIG. 7 provides additional details of an exemplary dynamic proxy 700. In one embodiment, the dynamic proxy 700 includes a plurality of method reference objects 1, 2, 3, . . . N, which correspond to the methods of the remote object. In one embodiment, the method reference objects are java.lang.ref objects which encapsulate a reference to the methods of the remote object. However, the underlying principles of the invention are not limited to any particular object types.

In operation, In response to receiving a method invocation to a remote object (in this case, a call to "method 2") the dynamic proxy 700 initiates an invocation handler 702 to manage the remote method call. A classloader 701 finds the reference object that corresponds to the called method (i.e., Method 2) and wraps the method in the invocation handler object. The invocation handler 702 then uses the parameters of the method to make the remote method call via the static skeleton or the dynamic skeleton on the remote virtual machine. In addition, in one embodiment, if the method invocation is to a local object, then a "local" invocation handler is used to manage the local method call. Alternatively, the invocation handler may be bypassed altogether and the local method call may be made directly to the local object.

Figure 8:
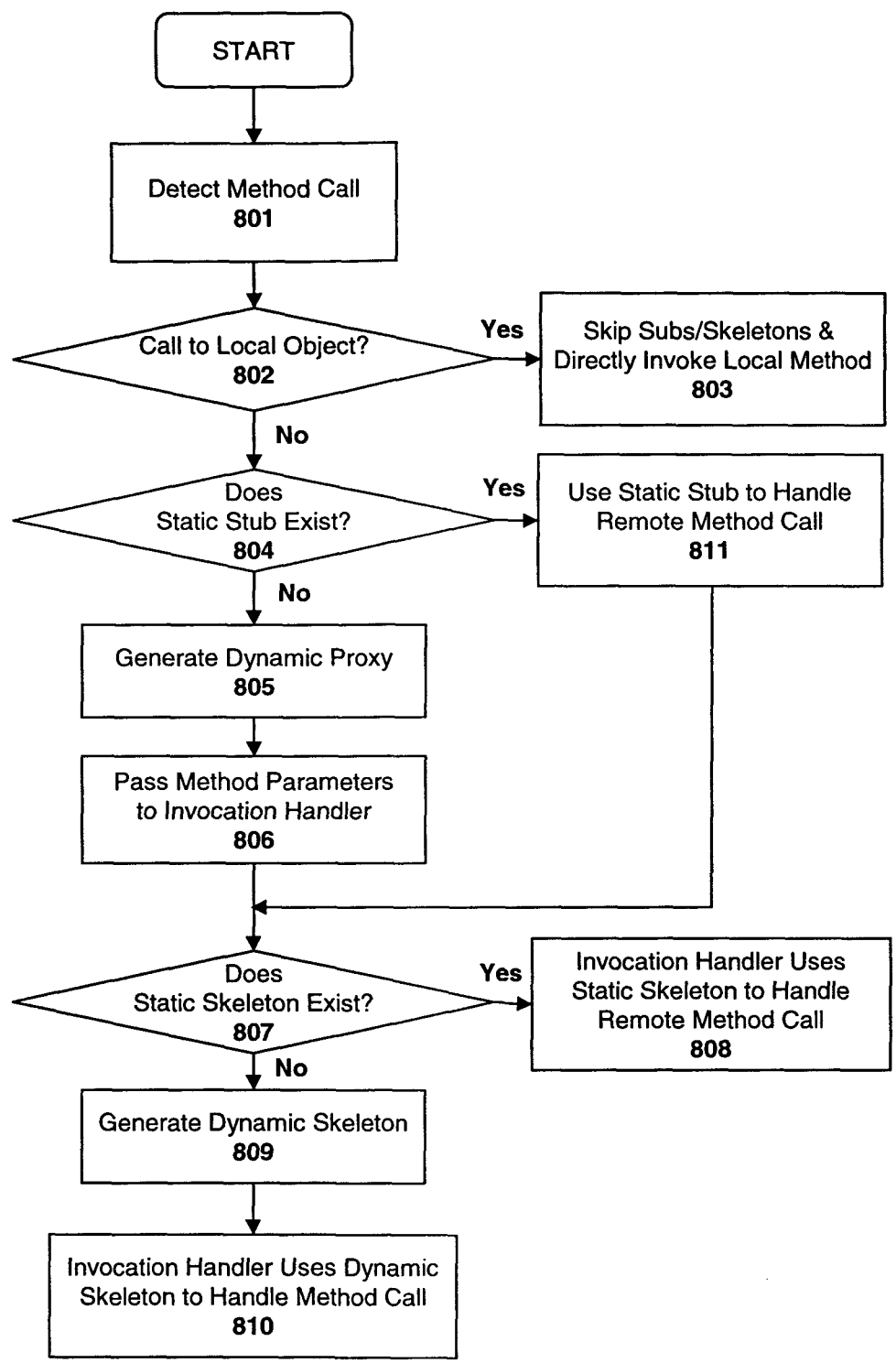
FIG. 8 illustrates a method for generating dynamic proxies and/or skeletons in accordance with one embodiment of the invention.

A method for generating dynamic proxies and skeletons according to one embodiment of the invention is set forth in FIG. 8. At 801 a method call is detected on a local virtual machine. If the call is a local method call, determined at 802, then at 803 no dynamic stubs and/or skeletons are generated and the method invocation is made directly to the local object.

If, however, the call is to a remote object, then at 804 a determination is made as to whether a static stub exists to handle the remote method invocation (i.e., a stub generated as a result of the RMIC compiler). If so, then at 811, the stub is used to handle the remote method call. If not, then at 805, a dynamic proxy such as that illustrated in FIG. 7 is generated on the local virtual machine to handle the remote method invocation. At 806, the method parameters are passed to the invocation handler which manages the remote method call via the static skeleton or the dynamic skeleton on the remote virtual machine.

If no static skeleton exists on the remote virtual machine (i.e., if no skeleton was generated by the RMIC compiler), determined at 807, then at 809, a dynamic skeleton is generated to handle the remote method call and at 810 the invocation handler communicates with the dynamic skeleton to process the remote method invocation. If a static skeleton already exists for the remote method, then at 808, the invocation handler communicates with the static skeleton to invoke the remote method. In one embodiment, the invocation handler identifies the particular remote method and passes the dynamic or static skeleton the method parameters. The dynamic or static skeleton then directly invokes the method on the remote object using the method parameters and provides the results back to the invocation handler on the local virtual machine.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, or other type of machine-readable media suitable for storing electronic instructions.

Throughout the foregoing description, for the purposes of explanation, numerous specific details were set forth in order to provide a thorough understanding of the invention. It will be apparent, however, to one skilled in the art that the invention may be practiced without some of these specific details. For example, although many of the embodiments set forth above relate to a Java or J2EE implementation, the underlying principles of the invention may be implemented in virtually any enterprise networking environment. Moreover, although some of the embodiments set forth above are implemented within a shared memory environment, the underlying principles of the invention are equally applicable to a non-shared memory environment. Finally, it should be noted that the terms "client" and "server" are used broadly to refer to any applications, components or objects which interact via remote method invocations.

Accordingly, the scope and spirit of the invention should be judged in terms of the claims which follow.

What is claimed is:

1. A method comprising:
   identifying whether a method call made by a first object and directed to a second object is a local method call or a remote method call;
   responsive to an identification that the method call is the local method call:
      binding the first object directly to the second object; and
      making the method call directly to the second object; and
   responsive to an identification that the method call is the remote method call:
      detecting whether a stub capable of handling the remote method call exists;
      responsive to an identification that the stub exists, using the stub to handle the remote method call;
      responsive to an identification that the stub does not exist:
         generating a dynamic proxy; and
         using a remote invocation handler of the dynamic proxy to manage the remote method call, the using of the remote invocation handler comprising:
            receiving the remote method call at the dynamic proxy;
            finding a reference object that corresponds to the remote method call; and
            wrapping a remote method in an invocation handler object;
      detecting whether a skeleton capable of handling the remote method call exists;
      responsive to a detection that the skeleton exists, using a parameter of the remote method to make the remote method call via the skeleton; and
      responsive to a detection that the skeleton does not exist, generating a dynamic skeleton, and using a parameter of the remote method to make the remote method call via the dynamic skeleton.

2. The method of claim 1, wherein the finding of the reference object includes employing a class loader to find the reference object from within a plurality of method reference objects, each one of the plurality of method reference objects encapsulating respective one of a plurality of references to methods of the second object.

3. The method of claim 2, wherein each of the plurality of method reference objects is a Java reference class.

4. The method of claim 1, wherein the identifying is accomplished by analyzing the method call at run time.

5. A system comprising:
one or more microprocessors;
one or more memories coupled to the one or more microprocessors, the one or more memories configuring the one or more microprocessors to perform operations, the operations comprising:
identifying whether a method call made by a first object and directed to a second object is a local method call or a remote method call;
responsive to an identification that the method call is the local method call:
binding the first object directly to the second object; and
making the method call directly to the second object; and
responsive to an identification that the method call is the remote method call:
detecting whether a stub capable of handling the remote method call exists;
responsive to an identification that the stub exists, using the stub to handle the remote method call;
responsive to an identification that the stub does not exist:
generating a dynamic proxy; and
using a remote invocation handler of the dynamic proxy to manage the remote method call, the using of the remote invocation handler comprising:
receiving the remote method call at the dynamic proxy;
finding a reference object that corresponds to the remote method call; and
wrapping a remote method in an invocation handler object;
detecting whether a skeleton capable of handling the remote method call exists;
responsive to a detection that the skeleton exists, using a parameter of the remote method to make the remote method call via the skeleton; and
responsive to a detection that the skeleton does not exist, generating a dynamic skeleton, and using a parameter of the remote method to make the remote method call via the dynamic skeleton.

6. The system of claim 5, wherein the finding of the reference object includes employing a class loader to find the reference object from within a plurality of method reference objects, each one of the plurality of method reference objects encapsulating respective one of a plurality of references to methods of the second object.

7. The system of claim 6, wherein each of the plurality of reference objects is a Java reference class.

8. The system of claim 5, wherein the identifying is accomplished by analyzing the method call at run time.

9. A non-transitory machine readable medium embodying a set of instructions that, when executed by a processor, causes the processor to perform a method, the method comprising:
identifying whether a method call made by a first object and directed to a second object is a local method call or a remote method call;
responsive to an identification that the method call is the local method call:
binding the first object directly to the second object; and
making the method call directly to the second object; and
responsive to an identification that the method call is the remote method call:
detecting whether a stub capable of handling the remote method call exists;
responsive to an identification that the stub exists, using the stub to handle the remote method call;
responsive to an identification that the stub does not exist:
generating a dynamic proxy; and
using a remote invocation handler of the dynamic proxy to manage the remote method call, the using of the remote invocation handler comprising:
receiving the remote method call at the dynamic proxy;
finding a reference object that corresponds to the remote method call; and
wrapping a remote method in an invocation handler object;
detecting whether a skeleton capable of handling the remote method call exists;
responsive to a detection that the skeleton exists, using a parameter of the remote method to make the remote method call via the skeleton; and
responsive to a detection that the skeleton does not exist, generating a dynamic skeleton, and using a parameter of the remote method to make the remote method call via the dynamic skeleton.

10. The non-transitory machine readable medium of claim 9, wherein the finding of the reference object includes employing a class loader to find the reference object from within a plurality of method reference objects, each one of the plurality of method reference objects encapsulating respective one of a plurality of references to methods of the second object.

11. The system of claim 10, wherein each of the plurality of reference objects is a Java reference class.

* * * * *